(12) United States Patent
Crenshaw

(10) Patent No.: US 7,540,112 B1
(45) Date of Patent: Jun. 2, 2009

(54) CLEAN KILL FLY SWATTER

(76) Inventor: Floyd D. Crenshaw, P.O. Box 176, Hominy, OK (US) 74035

( * ) Notice: Subject to any disclaimer, the term of this patent is extended or adjusted under 35 U.S.C. 154(b) by 1420 days.

(21) Appl. No.: 10/116,973

(22) Filed: Apr. 5, 2002

(51) Int. Cl.
*A01M 3/02* (2006.01)
(52) U.S. Cl. ....................................................... 43/137
(58) Field of Classification Search ................... 43/137; D22/124
See application file for complete search history.

(56) References Cited

U.S. PATENT DOCUMENTS

| | | | |
|---|---|---|---|
| 1,161,654 A | 11/1915 | Gomber | |
| 1,268,640 A * | 6/1918 | Stearns | 43/137 |
| 1,299,580 A | 4/1919 | Krumlaw | |
| 1,326,577 A * | 12/1919 | Cullen | 43/137 |
| 1,487,750 A * | 3/1924 | Miller | 43/137 |
| 1,939,838 A * | 12/1933 | Wasson | 43/137 |
| 1,942,252 A * | 1/1934 | Martin | 43/137 |
| 1,966,198 A * | 7/1934 | Buhler | 43/137 |
| 2,014,364 A * | 9/1935 | Achor | 43/137 |
| 2,023,209 A * | 12/1935 | Platt | 43/137 |
| 2,068,211 A * | 1/1937 | Wasson | 43/137 |
| 2,604,723 A * | 7/1952 | Bennett | 43/137 |
| 2,618,882 A | 11/1952 | Martin | 43/136 |
| 2,686,746 A | 8/1954 | Harney | 154/53.6 |
| 3,673,730 A | 7/1972 | Hegenberger | 43/137 |
| 4,593,489 A | 6/1986 | Gott et al. | 43/137 |
| 4,651,464 A | 3/1987 | Baker | 43/137 |
| 4,653,222 A | 3/1987 | Viscosi | 43/137 |
| 4,787,171 A | 11/1988 | Dagenais | 43/137 |
| 5,269,092 A | 12/1993 | Cobble | 43/137 |
| 5,377,446 A * | 1/1995 | DiLeo | 43/137 |
| 5,586,407 A | 12/1996 | Raymond | 43/137 |

\* cited by examiner

*Primary Examiner*—Kurt Rowan
(74) *Attorney, Agent, or Firm*—Gable Gotwals

(57) ABSTRACT

A method and a fly swatter for practicing the method of killing a fly resting on a support surface without smashing the fly against the support surface, including a swatter having, at the outer end of an elongated handle, a head portion formed of a generally planer, pliable, foraminous sheet having on an inner surface a peripheral lip, including the step of striking, by use of the handle, the head portion to instantaneously encapture the fly between the sheet inner surface and the support surface and within the peripheral lip, compressing air that passes out through the foraminous sheet suddenly forcing the fly against the sheet inner surface, the impact of the fly contacting the sheet inner surface and/or the aerodynamic shock of compressed air serving to kill the fly without compressing the fly against the support surface.

17 Claims, 2 Drawing Sheets

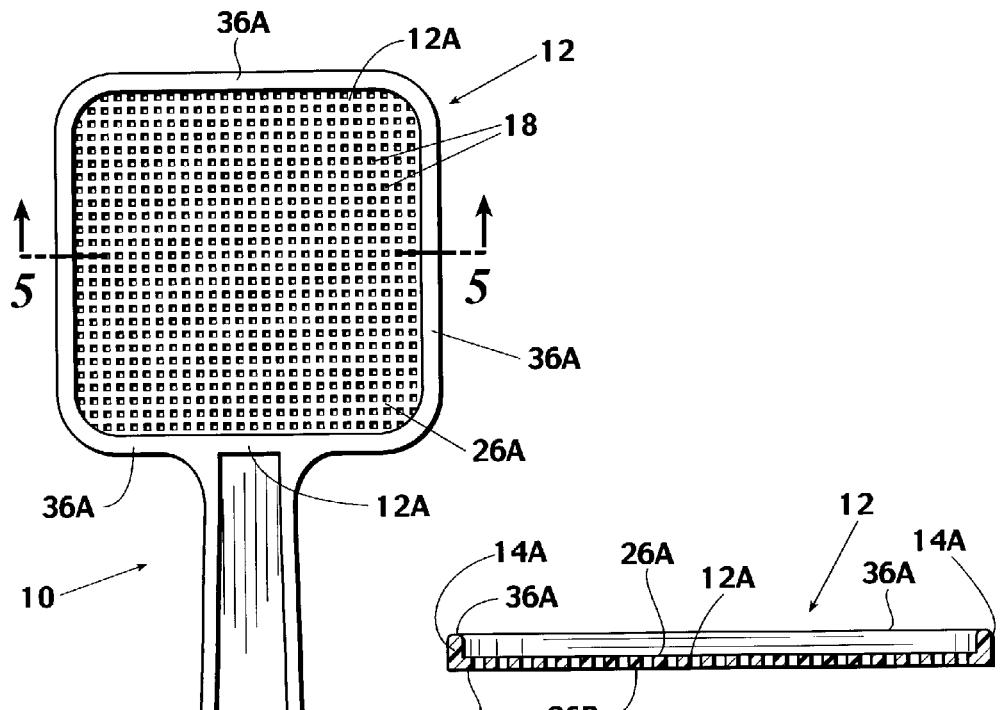
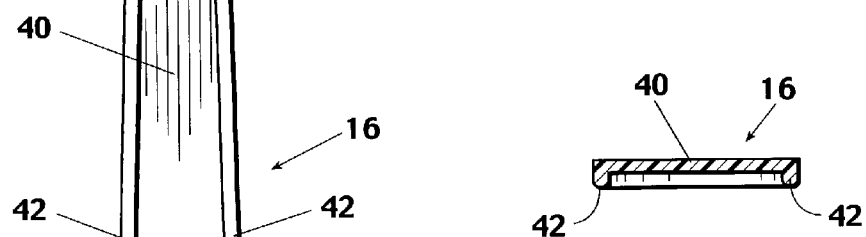
Fig. 5
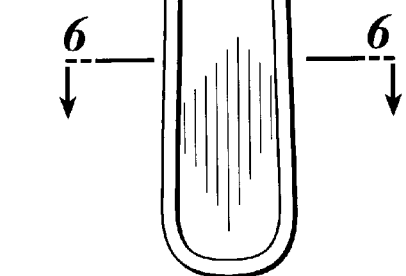
Fig. 4
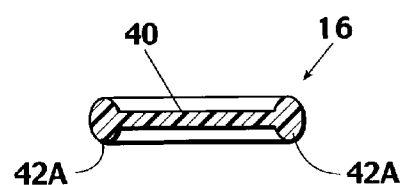
Fig. 6
Fig. 6A

CLEAN KILL FLY SWATTER

REFERENCE TO PENDING APPLICATIONS

This application is not based upon any pending domestic or international patent applications.

REFERENCE TO MICROFICHE APPENDIX

This application is not reference in any microfiche appendix.

FIELD OF THE INVENTION

The present invention is generally directed toward a method of killing a fly resting on a support surface without compressing the fly against the support surface.

BACKGROUND OF THE INVENTION

A most common household tool is the "fly swatter." Virtually every home needs an implement for killing insects, particularly flying insects that are typically commonly referred to as "flies." However, in addition to the common housefly, other insects such as bees, wasps, roaches and so forth that run, fly and crawl around a house are most expeditiously killed by use of a fly swatter. This commonly used appliance is formed of a head portion having an elongated handle extending from it. Up until recently, the head portion was commonly made of screen wire and frequently the handle portion was made of stiffer wire. Currently fly swatters typically have a head portion that is made of plastic with a handle existing from the head portion. Wire is still commonly used for the handles however plastic handles are also employed. Inexpensive fly swatters are molded of plastic with the head portion being integral with the handle. A fly swatter head portion is typically square or rectangular and of a size of about 16-25 square inches. The handle is usually about 18-30 inches long. The head portion is usually formed of screen wire or perforated plastic to allow air to freely pass therethrough as the swatter is swung to engage a fly or other insect.

Fly swatters work very successfully as is evident from their pervasive usage. However, there is one problem with the typical fly swatter and that is that a fly resting on a support surface is killed by mashing or squashing the fly against the support surface. When a fly is killed by being struck with the commonly employed fly swatter, an unsanitary situation is created. The body contents of the fly are frequently forced out against the support surface. This not only creates an unsanitary situation, but if the support surface happens to be porous (such as a table cloth or other furniture covering) the mashed fly can result in the discoloration or staining of the cloth material. Even if the fly is killed on a surface that has a hard finish, such as wood furniture or the like, it frequently still leaves a mess that must be cleaned up. If a fly or other insect is killed against wallpaper a permanent marking on the wallpaper can occur.

For all these reasons it is desirable that a means be provided for killing a fly that does not result in mashing the fly against the surface on which the fly rests.

Others have attacked the problem of killing flies without smashing them against a support surface, such as U.S. Pat. No. 3,673,730 entitled "Fly Swatter" that issued on Jul. 4, 1972. This patent provides a fly swatter that has a perforated sheet of resilient plastic material to which is bonded relatively thick cushioning strips of sponge-like plastic material. The swatter in this disclosure has a problem in that the cushioning strips are formed in a pattern that extend across the face of the perforated sheet, creating a situation wherein the likelihood of engaging a fly with the cushioning material is significant. That is, it would take an accurate aim to strike a fly in such a way as to avoid contact of the fly with the cushioning strips.

Other prior art references that relate to killing an insect with a fly swatter device without smashing the insect include U.S. Pat. Nos. 1,161,654; 2,618,882 and 4,787,171. Each of these patents has problems that have prevented the inventions from becoming widely used.

For other background information relative to the subject matter of this invention, reference may be had to the following United States patents:

| Pat. No. | Inventor(s) | Title |
| --- | --- | --- |
| 1,161,654 | Gomber | Insect Killing Device |
| 1,299,580 | Krumlaw | Insect Destroyer |
| 2,618,882 | Martin | Fly Swatter |
| 2,686,746 | Harney | Binding Tape for the Edges of Mesh Fly Swatters and the Like |
| 3,673,730 | Hegenberger | Fly Swatter |
| 4,593,489 | Gott et al. | Insect Swatter |
| 4,651,464 | Baker | Insect Swatter Having Continuous Planar Soft and Rigid Surfaces |
| 4,653,222 | Viscosi | Insect Swatter |
| 4,787,171 | Dagenais | Insect Swatter |
| 5,269,092 | Cobble | Fly Trap Apparatus |
| 5,586,407 | Raymond | Swatter and Method of Using the Same |

BRIEF SUMMARY OF THE INVENTION

This disclosure herein is a fly swatter for killing a fly resting on a support surface in a manner that the fly is not squashed or smashed against the support surface. The term "fly" is used herein and throughout this disclosure to mean any insect such as and including specifically bees, wasps, roaches, worms and so forth that are common pests. The fly swatter of this invention is formed of a thin plastic foraminous sheet having a peripheral edge and opposed inner and outer surfaces. The thin pliable sheet forms a head portion of the fly swatter. A lip member is formed on the inner surface of the sheet adjacent the peripheral edge. In a preferred embodiment, this lip member may be formed of a strip of foam plastic that is secured to the inner surface of the sheet such as by means of an adhesive. In another embodiment, the lip member can be integrally formed with the sheet.

A handle extends from the peripheral edge of the sheet. The lip member is of sufficient thickness that the sheet inner surface is supported away from a support surface when the fly swatter is employed to kill a fly. Specifically, the improved fly swatter of this disclosure is constructed in a way whereby the fly is momentarily entrapped and killed by aerodynamic shock as the sheet and lip member suddenly encapsulates the fly against a resting surface.

A unique feature of the fly swatter of this invention is that it accomplishes a new and different method of killing a fly in which instead of physically squashing the fly, the fly is killed by sudden aerodynamic shock. As the fly swatter is swung to engage a fly, the lip member surrounds the fly so that thereby the sheet imprisons the fly between itself and the support surface with the imprisonment space being surrounded by the lip member.

The sheet is foraminous—that is, highly perforated and filled with open spaces allowing air to escape therethrough. As the head portion of the fly swatter suddenly encompasses a fly and traps the fly against a support surface surrounded by the lip member, air is instantaneously forced from the enclosed space, the air passing through the perforations forming the foraminous sheet. This sudden rush of air through the perforated sheet carries the fly against the sheet inner surface to thereby kill the fly by the impact. Thus the fly is killed simultaneously by sudden aerodynamic shock as well as by impact against the sheet inner surface.

The fly swatter is constructed so that the fly is not compressed, smashed or squashed against the support surface so that if there is any dispersal of contents of the fly, it is against the fly swatter sheet inner surface and not against the support surface on which the fly rests at the time that the fly swatter is used to kill the fly.

Further objects and features of the present invention will be apparent to those skilled in the art upon reference to the accompanying drawings and upon reading the following description of the preferred embodiments.

A better understanding of the invention will be had from the following description and claims taken in conjunction with the attached drawings.

BRIEF DESCRIPTION OF THE DRAWINGS

FIG. 2 also shows a support surface, such as the top of a table on which a fly rests and shows the fly swatter head portion in position immediately before the fly is killed.

FIG. 4 is a bottom view of an alternate embodiment of the invention in which the fly swatter is integrally formed of plastic material.

FIG. 5 is a cross-sectional view taken of the head portion of the fly swatter of FIG. 4 showing that the head portion sheet and the lip member are integrally formed.

FIG. 6 is a cross-sectional view of the fly swatter handle taken along the line 6-6 of FIG. 4.

FIG. 6A is a cross-sectional view as in FIG. 6, but showing an alternate configuration of the handle.

DETAILED DESCRIPTION OF THE PREFERRED EMBODIMENTS

Figure 1:
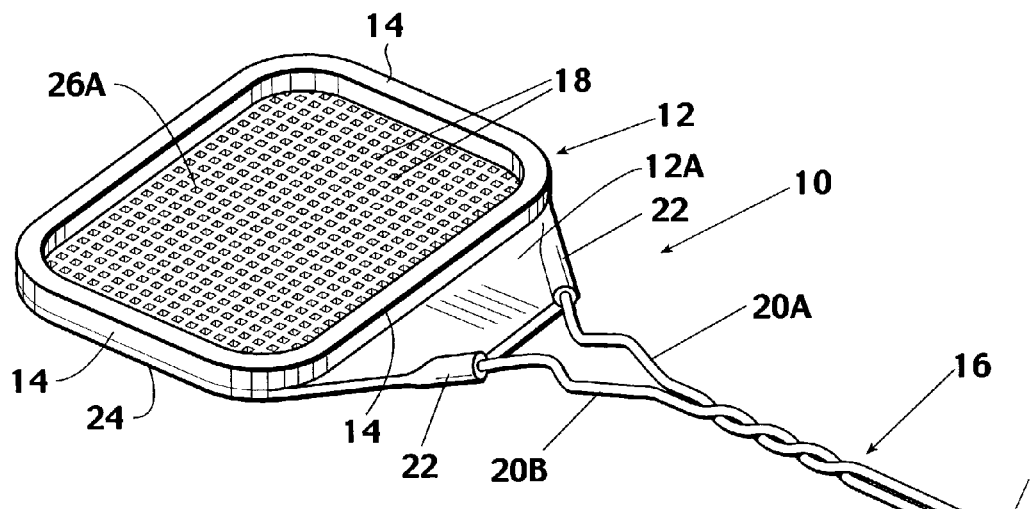
FIG. 1 is a partial isometric view of one embodiment of the invention showing a fly swatter having a sheet portion with an inner surface and with a peripheral lip member affixed to the inner surface. In the illustrated arrangement, the lip member is a strip of sponge rubber material that is secured by adhesive or other bonding methods to the sheet inner surface. The embodiment of FIG. 1 includes a wire handle, only a portion of which is seen in FIG. 1.
Figure 2:
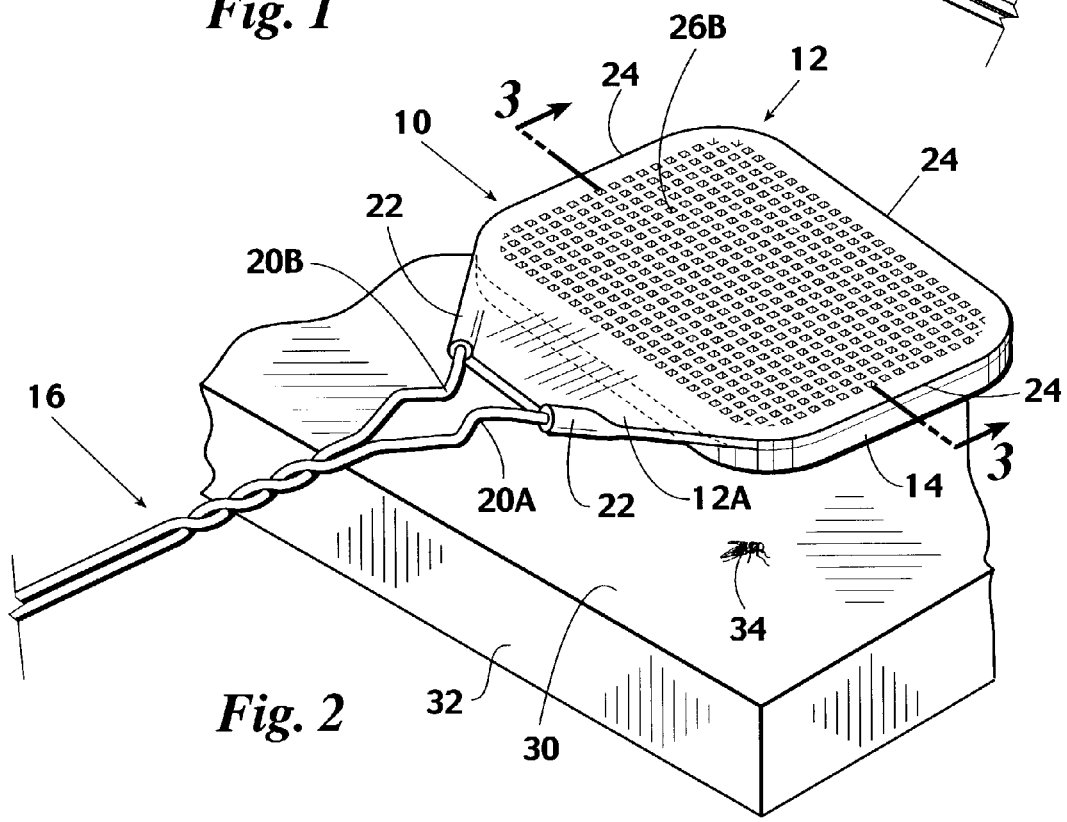
FIG. 2 is an isometric view as in FIG. 1 but showing the rearward surface of the head portion and showing a part of the wire handle that extends from the fly swatter head portion.
Figure 3:
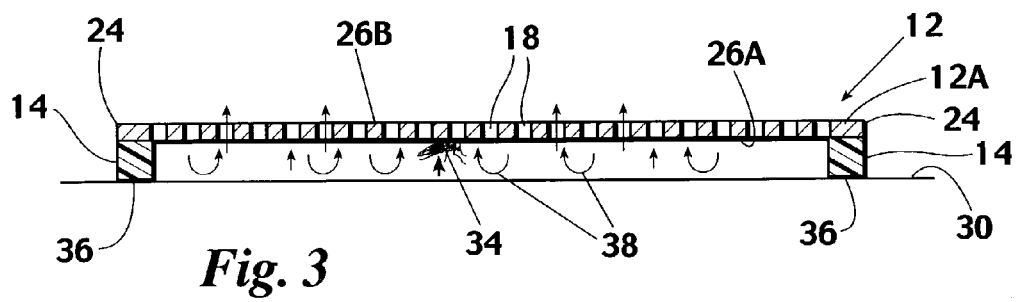
FIG. 3 is a cross-sectional view taken along the line 3-3 of FIG. 2 showing a fly encaptured between the inner surface of the swatter head portion and the surrounding lip member. Arrows show the direction of air rushing out through perforations in the head portion sheet, the out-rushing air serving to carry the fly into lethal contact with the sheet inner surface.

Referring to the drawing and first to FIGS. 1 through 3, an embodiment of the improved fly swatter of this invention is identified with the numeral 10. The fly swatter contains three basic portions,—that is, a head portion 12 formed of a foraminous sheet 12A; a circumferential lip member 14 and a handle 16. The foraminous sheet 12A of the fly swatter of FIG. 1 is molded of plastic. Sheet 12A has a plurality of small openings 18—that is, sheet 12A is thoroughly perforated. Handle 16 is formed of wires—that is, specifically a first wire 20A and a second wire 20B. Wires 20A and 20B extend in parallel and are twisted at certain places so that the wires provide a relatively stiff handle by which head portion 12 is swung to engage an insect. Extending from a rearward end of sheet 12A are opposed molded portions 22 that receive the outer ends of wires 20A and 20B, by which handle 16 is attached to sheet 12A.

Sheet 12A has a peripheral edge 24, an inner surface 26A (seen in FIG. 1) and (as seen in FIG. 2) an opposite outer surface 26B. Secured to the sheet inner surface 26A at the peripheral edge 24 is lip member 14. In the illustrated arrangement, the lip member 14 is formed of a strip of sponge rubber or foam plastic that is secured to the sheet inner surface 26A, such as by means of an adhesive. Instead of the use of an adhesive, lip member 14 may be secured to sheet 12A by thermal bonding or by any means by which a plastic or rubber sponge material can be secured to sheet 12A.

FIG. 2 shows a support surface 30 which may be such as the top of a table 32. A fly 34 is shown resting on support surface 30 and the fly swatter head portion 12 is illustrated as it is being swung to kill fly 34. Thus, FIG. 2 shows the relationship between the fly swatter head portion 12 and a support surface 30 immediately before the head portion engages the support surface to encapture and kill fly 34.

FIG. 3 shows the instant the fly swatter head portion 12 engages support surface 30 to kill fly 34. As seen in FIG. 3, the circumferential lip member 14 has a planar contact surface 36 that engages support surface 30 while the head portion sheet inner surface 26A is held away from support surface 30. The thickness of lip member 14—that is, the spacing between sheet inner surface 26A and support surface 30 is preferably between about $3/16$ inches and $7/16$ inches. Air captured by the swatter head portion as it engages support surface 30 is quickly dissipated through perforated openings 18. Arrows 38 (in FIG. 3) show the direction of air that quickly flows out of the confined area created when the fly swatter lip peripheral contact surface 36 engages support surface 30. The air suddenly escaping through the foraminous openings in the sheet forces the fly 34 upwardly against the sheet inner surface 26A. Fly 34 is killed by instantaneous aerodynamic shock and/or lethal impact against sheet inner surface 26A. Fly 34 is killed without smashing or squashing it against support surface 30.

FIGS. 4 through 6 show an alternate embodiment of the invention wherein the improved fly swatter is integrally formed of molded plastic such as polyethylene or any similar pliable plastic moldable material. In the embodiment of FIGS. 4 through 6, the lip portion 14A is integrally formed with head portion sheet 12A. Further, handle 16 is integrally formed with sheet 12A.

When the fly swatter of FIGS. 4 through 5 is employed, the planar lip contact surface 36A engages a support surface (not shown in FIGS. 4 through 6) in the same way that the contact surface 36 of the lip element 14 of FIG. 3 engages a support surface. The thickness of lip portion 14A—that is the spacing between lip contact surface 36A and sheet inner surface 26A is between about $3/16$ inches and $7/16$ inches. The integral embodiment of FIGS. 4 through 6 functions in the same way as that of FIGS. 1 through 3.

Handle 16 is, in this embodiment, integrally formed with the head portion 12, as previously stated. FIG. 6 is a cross-sectional view showing the handle 16 that includes a web portion 40 with integral increased thickness flange portions 42. In this way, the integral lip portions 14A extending from head sheet 12A is looped around handle central web. Handle flange portion 42 has no aerodynamic function but to serve only as structural reinforcement for handle 16. FIG. 6A shows an alternate embodiment of FIG. 6 wherein the flange portion 42A that extends around the handle web portion 40 are symmetrical as to the top and bottom surfaces of the web portion. This illustrates that the handle can be formed in a variety of ways since the handle only has the function of providing a means of swinging the head portion to entrap a fly against a support surface.

Comparing the embodiment of FIGS. 1 through 3 with the embodiment of FIGS. 4 through 6, illustrates that the actual apparatus to practice the invention may have a variety of configurations. As previously stated, the essence of the invention is to provide a fly swatter, including a head portion with an extending handle and in which the head portion includes a planer sheet with an inner and outer surface and with a lip member extending from the peripheral edge of the sheet inner surface so that a fly is encompassed between the head portion sheet and a support surface and surrounded by the integral lip element to create an environment in which the fly is subjected to sudden aerodynamic shock and in which the instantaneous escape of entrapped air forces the fly against the head portion sheet inner surface in a way that the fly is killed without smashing the fly against the support surface.

The phraseology and terminology employed herein are for the purpose of description and not of limitation.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A fly swatter for killing a fly resting on a support surface, comprising:
    a thin pliable foraminous sheet having a peripheral edge and opposed inner and outer surfaces;
    a lip portion formed of a strip of foam plastic material on said sheet inner surface adjacent said peripheral edge; and
    a handle extending from said peripheral edge of said sheet, said lip portion being of thickness of about 3/16 inches to 7/16 inches, so that said sheet inner surface is supported away from a support surface when the fly swatter is employed to kill a fly, whereby the fly is not smashed but is momentarily entrapped and killed by aerodynamic shock as said sheet and lip portion suddenly encapture the fly against the support surface.

2. A fly swatter according to claim 1 wherein said lip portion and said sheet are integrally formed.

3. A fly swatter according to claim 1 wherein said handle is separately formed and is attached at one end to said sheet.

4. A fly swatter according to claim 1 wherein said handle is integrally formed with said sheet.

5. A fly swatter according to claim 2 wherein said handle is integrally formed with said sheet and said lip portion.

6. A fly swatter according to claim 1 wherein said sheet is of polyethylene plastic.

7. A fly swatter according to claim 2 wherein said lip portion and said sheet are integrally formed of polyethylene plastic.

8. A fly swatter according to claim 4 wherein said handle and said sheet are integrally formed of polyethylene plastic.

9. A fly swatter according to claim 8 wherein said lip portion and said sheet are integrally formed of polyethylene plastic.

10. A fly swatter according to claim 1 wherein said lip portion has a substantially flat forward surface in a plane parallel to and spaced from said sheet inner surface.

11. A method of killing a fly resting on a support surface without smashing it against the support surface, comprising:
    forming a swatter having at the outer end of an elongated handle a head portion formed of a generally planer, pliable, foraminous sheet having on an inner surface a peripheral lip of thickness of about 3/16 inches to 7/16 inches;
    striking, by use of said handle, said head portion to instantaneously capture the fly between said sheet inner surface and said support surface and within said peripheral lip, compressing air that passes out through said foraminous sheet to suddenly force the fly against said sheet inner surface, the impact of the fly contacting said sheet inner surface and/or aerodynamic shock of compressed air serving to kill the fly without smashing the fly against the support surface.

12. A method of killing a fly resting on a support surface, according to claim 11 wherein said peripheral lip is formed of a strip of foam plastic material secured to said sheet inner surface.

13. A method of killing a fly resting on a support surface, according to claim 11 wherein said peripheral lip and said sheet are integrally formed.

14. A method of killing a fly resting on a support surface, according to claim 11 wherein said handle is separately formed and is attached at one end to said sheet.

15. A method of killing a fly resting on a support surface, according to claim 11 wherein said handle is integrally formed with said sheet.

16. A method of killing a fly resting on a support surface, according to claim 11 wherein said handle is integrally formed with said sheet and said peripheral lip.

17. A system for killing a fly resting on a support surface comprising:
    a head portion formed of a planar, pliable sheet having a peripheral edge affixed at an outer end of a handle and having an increased thickness peripheral lip at said peripheral edge formed of a strip of foam plastic with a lower circumferential planar contact surface that is spaced from said sheet about 3/16 inches to 7/16 inches, the sheet being fornaminous to thereby time-release compressed air trapped within said peripheral lip when the head portion strikes the support surface resulting in instantaneous high velocity air flow through said sheet to carry a fly confined within said peripheral lip into lethal impact with said sheet.

\* \* \* \* \*